United States Patent [19]

Saito et al.

[11] Patent Number: 4,728,563
[45] Date of Patent: Mar. 1, 1988

[54] MAGNETIC RECORDING MEDIUM

[75] Inventors: Shinji Saito; Hiroshi Ogawa; Chiaki Mizuno; Yasuo Tamai, all of Odawara, Japan

[73] Assignee: Fuji Photo film Co., Ltd., Japan

[21] Appl. No.: 898,421

[22] Filed: Aug. 20, 1986

[30] Foreign Application Priority Data

Aug. 20, 1985 [JP] Japan .................................. 60-182631

[51] Int. Cl.$^4$ ......................... G11B 5/70; G11B 5/704
[52] U.S. Cl. ..................................... 428/212; 428/480; 428/694; 428/900
[58] Field of Search ............... 428/694, 480, 900, 212; 427/128

[56] References Cited

U.S. PATENT DOCUMENTS

| | | | |
|---|---|---|---|
| 4,202,927 | 5/1980 | Yamaguchi et al. | 428/900 |
| 4,316,927 | 2/1982 | Kimura et al. | 428/694 |
| 4,539,260 | 9/1985 | Abe et al. | 428/480 |
| 4,579,778 | 4/1986 | Yamaguchi et al. | 428/694 |

*Primary Examiner*—Paul J. Thibodeau
*Attorney, Agent, or Firm*—Gerald J. Ferguson, Jr.; Michael P. Hoffman; Michael J. Foycik, Jr.

[57] ABSTRACT

A magnetic recording medium in the form of tape such as an audio-tape or a video-tape comprising a flexible support and a magnetic recording layer provided on said support, said magnetic recording layer comprising a ferromagnetic powder dispersed in a binder, which is characterized in that said magnetic recording medium has dynamic modulus of not lower than $4.5 \times 10^{10}$ dyne/cm$^2$ in the longitudinal direction at 110° C.

8 Claims, No Drawings

MAGNETIC RECORDING MEDIUM

BACKGROUND OF THE INVENTION

1. Field of the Invention

The present invention relates to a magnetic recording medium. More particularly, the invention relates to a magnetic recording medium in the form of tape such as an audio-tape or a video-tape which shows excellent running property even after the medium is exposed to a high temperature.

2. Description of Prior Arts

A magnetic recording medium in the form of tape (e.g., an audio-tape or a video-tape encased in a cassette) has been conventionally employed or stored in an environment having less temperature variation such as in an interior of house. However, a radio cassette tape-recorder (i.e., a cassette tape-recorder with radio), a stereo record player for automobiles or a small-sized video tape recorder, etc. are widely employed in recent years, the magnetic recording media are now frequently employed or stored in a severe environment such as an environment of high temperature, environment of high temperature and high humidity, or environment of low temperature. For instance, it is reported that the highest temperature in an automobile interior is 104° C. during day time in the summer season according to the high-temperature or low-temperature exposure test of automobile parts (JIS D0204).

A magnetic recording medium in the form of tape exposed to such a high temperature is apt to shrink to curl, or to shrink more greatly on the edge of one side than that of the other side to have a bow shape in the longitudinal direction. Otherwise, a hub of a cassette half is likely deformed or ejected out, because the magnetic recording medium shrinks to excessively tighten the hub. Further, when a magnetic recording medium such as an audio-tape recorded with music is exposed to high temperature, not only the output level greatly varies in a reproduction process to cause abnormal reproduction, but also the magnetic recording medium shows poor running property. Especially in the case of using an audio-tape having a thin support (e.g., audio compact cassette tapes such as C-80 type, C-90 type and C-120 type), the above-mentioned troubles caused by the shrinkage of tapes markedly take place, because the tape encased in a casette half is so long that the winding times of tape around the hub increases.

In the case of a video cassette tape, the recent wide use of portable VTRs request the tape to have much more improved running property and durability than the conventional ones. While tapes need to be highly durable, the tape thickness tends to be thinner, for example, less than 20 μm. A video-tape exposed to a high temperature is likely to produce tape distortion caused by the heat shrinkage as well as in the above-mentioned audiotape. Further, other characteristic problems of video tapes such as an occurrence of skew in a reproduction process tend to be brought about.

For coping with the above-mentioned troubles probably caused by the heat shrinkage of tapes which occurs after storage at a high temperature, there has been proposed a method of adjusting a draw ratio of a plastic sheet (base) for the preparation of a support so as to produce a support having a low heat shrinkage ratio. The troubles caused by the heat shrinkage of tapes can be improved to a certain level by such method, but the level is still unsatisfactory.

SUMMARY OF THE INVENTION

It is an object of the present invention to provide a magnetic recording medium in the form of tape which shows an excellent running property even after the medium is stored in an environment of a high temperature.

It is another object of the invention to provide a magnetic recording medium in the form of tape which is hardly distorted even after the medium is stored in an environment of a high temperature.

It is a further object of the invention to provide an audio cassette tape which less generates so-called creaks in a running procedure of tape even after the tape is stored in an environment of a high temperature.

It is a still further object of the invention to provide a video cassette tape which less generates jitter or skew even after the tape is stored in an environment of a high temperature.

There is provided by the present invention a magnetic recording medium in the form of tape comprising a flexible support and a magnetic recording layer provided on said support, said magnetic recording layer comprising a ferromagnetic powder dispersed in a binder, which is characterized in that said magnetic recording medium has dynamic modulus of not lower than $4.5 \times 10^{10}$ dyne/cm$^2$, preferably not lower than $6.0 \times 10^{10}$ dyne/cm$^2$, more preferably not lower than $8.0 \times 10^{10}$ dyne/cm$^2$, in the longitudinal direction at 110° C.

In the magnetic recording medium in the form of tape according to the invention, the flexible support preferably has dynamic modulus of not lower than $2.5 \times 10^{10}$ dyne/cm$^2$ in the longitudinal direction at 110° C.

The dynamic modulus at 110° C. defined in the present invention means elastic modulus measured under the dynamic condition in an atmosphere of 110° C. The dynamic modulus can be determined according to a known method such as a method of utilizing forced vibrations, free damping vibrations of shocks. In the present invention, the dynamic modulus at 110° C. is determined as follows. A dynamic modulus curve with temperature variation is first obtained using a dynamic modulus measuring device (DDV-II type, produced by Toyo Boldwin Co., Ltd.) under the conditions of a frequency of 35 Hz and a temperature rising at a rate of 3° C./min. from room temperature. From the obtained dynamic modulus curve with temperature variation, the dynamic modulus at 110° C. is determined.

DETAILED DESCRIPTION OF THE INVENTION

A process for the preparation of a magnetic recording medium in the form of tape such as an audio-tape or a video-tape comprising providing a magnetic recording layer containing a ferromagnetic powder disposed in a binder on a flexible support has been conventionally known. The magnetic recording medium in the form of tape according to the present invention can be prepared basically in the same manner as in the known method. However, since the present medium needs to have dynamic modulus (dynamic modulus at 110° C.; the term "dynamic modulus" means dynamic modulus at 110° C. hereinafter, unless otherwise specified) higher than the conventional ones, much attention should be paid in various procedures such as a procedure of selecting a material of each component or a procedure of selecting the preparation conditions.

For increasing the dynamic modulus of the magnetic recording medium in the form of tape, there can be employed any one of a method of increasing the dynamic modulus of the flexible support, a method of increasing the dynamic modulus of the magnetic recording layer, and a method of increasing both of the dynamic modulus of the flexible support and the dynamic modulus of the magnetic recording layer.

The dynamic modulus of the flexible support can be increased by appropriately selecting a support material from those having higher dynamic modulus than the conventional ones such as films of polyester, polycarbonate, polyamide, polysulfone, polypropylene, polyether sulfone. The flexible support employable in the invention has dynamic modulus of not lower than $2.5 \times 10^{10}$ dyne/cm$^2$ (preferably not lower than $5.5 \times 10^{10}$ dyne/cm$^2$, more preferably not lower than $8.5 \times 10^{10}$ dyne/cm$^2$) in the longitudinal direction at 110° C.

The dynamic modulus of the magnetic recording layer can be increased by utilizing various methods such as a method of selecting the shape of ferromagnetic powder, a method of selecting a preferable binder, a method of adjusting a radio between the ferromagnetic powder and the binder, and a method of selecting suitable additives. In the practical viewpoint, preferred is a method of selecting such a binder that the electromagnetic conversion characteristic of the resultant magnetic recording medium are less affected thereby.

Examples of the binder employable for the magnetic recording medium of the present invention include vinyl chloride/vinyl acetate copolymers, terpolymers such as vinyl chloride/vinyl acetate/vinyl alcohol copolymers, vinyl chloride/vinyl acetate/maleic acid anhydride copolymers and vinyl chloride/vinyl acetate/acrylic acid copolymers, vinyl chloride/vinylidene chloride copolymers, vinyl chloride/acrylonitrile copolymers, ethylene/vinyl acetate copolymers, nitrocellulose resins, acrylic resins, polyvinyl acetal resin, and polyvinyl butyral resin. Those resins can be employed in combination with a polyurethane resin or an isocyanate hardening agent. Preferably employed is a combination of a vinyl chloride/vinyl acetate copolymer and a polyurethane resin or a combination of a terpolymer comprising vinyl chloride and vinyl acetate and a polyurethane resin. As the former (i.e., copolymers and terpolymers), those having a small amount of vinyl acetate or those in which a portion of vinyl acetate is substituted with ethylene are preferably employed in the invention. As the latter (i.e., polyurethane resins), those containing a large amount of hard segments and having a high glass transition temperature (Tg) are preferably employed in the invention. If the polyurethane resin to be employed is a hardening resin containing an isocyanate group, the functional group is preferably contained therein in a large amount. In this case, after a magnetic paint (coating dispersion for the preparation of a magnetic recording layer) is coated on a support, the resulting magnetic recording layer is preferably provided with water, etc. to increase the crosslinking density of the binder.

In any case, the binder is desirably selected from materials having high dynamic modulus of binder clear film at 110° C., because the binder greatly influences physical properties of the resultant magnetic recording layer.

There is no specific limitation on the ferromagnetic powder employable for the magnetic recording medium of the invention. Examples of the ferromagnetic powder include $\gamma$-Fe$_2$O$_3$ powder, Co-modified iron oxide powder, Ba-modified ferrite powder, Sr-modified ferrite powder, and alloy powder having iron as main component.

In the present invention, the binder is contained in the magnetic recording layer in the amount of not larger than 40% by weight, preferably not larger than 30% by weight, based on the amount of the ferromagnetic powder.

The magnetic recording medium of the invention may contain in the magnetic recording layer an abrasive having Mohs' hardness of not lower than 6 (e.g., $\alpha$-Fe$_2$O$_3$, SiC, $\alpha$-Al$_2$O$_3$, etc.), carbon, etc. in addition to the above-mentioned ferromagnetic powder and binder. The magnetic recording layer of the present medium may further contain other additives such as a dispersing agent and a lubricant. Examples of the additives preferably employed in the invention include fatty acids, fatty acid esters, silicones and alcohols.

The ferromagnetic powder, binder and other optional additives are dispersed (dissolved) in an organic solvent to prepare a magnetic paint (coating dispersion for the preparation of a magnetic recording layer). The magnetic paint is then coated over the flexible support to give a coated layer. Subsequently, the support with the coated layer is subjected to various known processes such as a orienting process, drying process and a calendering process. Those known processes can be utilized in the preparation of the magnetic recording medium of the invention. However, the dispersibility of the ferromagnetic powder and the orienting property thereof in the longitudinal direction are preferably enhanced to obtain a magnetic recording layer having high dynamic modulus. Further, the calendering process is preferably carried out at a high pressure and a high temperature using a combination of a metal roll and a heat-resistant elastic roll.

Thus, a roll of a magnetic recording medium is produced. The roll is then slit into a magnetic recording medium in the form of tape having a desired width.

The magnetic recording medium in the form of tape according to the present invention is hardly distorted even after the medium has been stored or allowed to stand in an environment of a high temperature, resulting showing satisfactory running property.

Particularly, an audio cassette tape provided by the present invention produces less creaky sounds in the running procedure even after the tape has been stored in an environment of a high temperature, so that the tape is advantageous in the practical use.

Further, a video cassette tape provided by the present invention produces less jitter or skew even after the tape has been stored in an environment of a high temperature, so that the tape is advantageous in the practical use.

The examples and the comparison examples of the present invention are given below. In the following examples, the expression "part(s)" means "part(s) by weight", unless otherwise specified.

EXAMPLES 1–3

A magnetic paint (coating dispersion for the preparation of a magnetic recording layer) was prepared by the process comprising the steps of kneading the components indicated below and 25 parts of butyl acetate for 120 minutes using a kneader and dispersively mixing the resultant mixture with 225 parts of butyl acetate in a sand mill.

| | |
|---|---|
| $\gamma$-Fe$_2$O$_3$ (Hc: 380 Oe, needle ratio: 10/1, average particle length: 0.4 μm, S-BET: 28 m$^2$/g) | 100 parts |
| Vinyl chloride/vinyl acetate/vinyl alcohol copolymer (copolymerization ratio = 93:1:6) | 12 parts |
| Polyurethane resin (Tg: 0° C.) | 8 parts |
| Dimethyl polysiloxane | 3 parts |
| α-Almina | 1 part |

The magnetic paint was coated on polyethylene terephthalate films prepared independently (thickness: 7 μm, dynamic modulus at 110° C.: values indicated in Table 1) using a reverse roll, in such a manner that the resultant layer after drying would have thickness of 5 μm. While the coated layer was wet, the layer was treated with an electromagnet of 1,000 gauss to impart a magnetic orientation. After the coated layer was dried, the layer was subjected to supercalendering, to form a magnetic recording layer having a smooth surface on the film.

The film having the magnetic recording layer was slit to give an audio cassette tape having width of 3.81 mm (Phillips-type compact cassette tape).

COMPARISON EXAMPLE 1

The procedure of Example 1 was repeated except for using a polyethylene terephthalate film having dynamic modulus at 110° C. indicated in Table 1 to prepare an audio cassette tape.

COMPARISON EXAMPLE 2

The procedure of Example 1 was repeated except that the vinyl chloride/vinyl acetate/vinyl alcohol copolymer having coplymerization ratio of 93:1:6 and the polyurethane resin having Tg of 0° C. were replaced with a vinyl chloride/vinyl acetate/vinyl alcohol copolymer having copolymerization ratio of 91:3:6 and a polyurethane resin having Tg of −24° C., respectively, to prepare an audio cassette tape.

EVALUATION OF AUDIO CASSETTE TAPE

The compact cassette tapes obtained in the above examples were measured on the dynamic modulus at 110° C. Further, each tape was allowed to stand at 110° C. for 4 hours, and then the friction coefficient of the tape on the magnetic recording layer side against a stainless pole (diameter: 4 mm) was measured at an engagement angle of 180°.

Furthermore, after each tape was allowed to stand at 110° C. for 4 hours in such a condition that the tape was wound in a cassette, the running tests was carried out using 100 commercial audio cassette decks in an atmosphere of 25° C. and 50% RH to observe stoppage of tape running. In this test, the tape was also examined on the occurrence of creaky sounds.

The results of the evaluations obtained above are set forth in Tables 1 and 2.

TABLE 1

| | Dynamic modulus ($\times 10^{10}$ dyne/cm$^2$) | |
|---|---|---|
| | Support (Db) | Tape (Dt) |
| Example 1 | 3.0 | 4.7 |
| Example 2 | 6.0 | 6.4 |
| Example 3 | 9.0 | 8.2 |

TABLE 1-continued

| | Dynamic modulus ($\times 10^{10}$ dyne/cm$^2$) | |
|---|---|---|
| | Support (Db) | Tape (Dt) |
| Com. Example 1 | 2.0 | 4.1 |
| Com. Example 2 | 3.0 | 3.8 |

TABLE 2

| | After storage at 110° C. for 4 hours | | |
|---|---|---|---|
| | Friction coefficient | Ratio on stoppage of running | Tape creaking |
| Example 1 | 0.25 | 5% | none |
| Example 2 | 0.23 | 2.5% | none |
| Example 3 | 0.22 | 0% | none |
| Com. Example 1 | 0.35 | 40% | observed |
| Com. Example 2 | 0.37 | 60% | observed |

EXAMPLES 4-6

A magnetic paint (coating dispersion for a magnetic recording layer) was prepared by the process comprising the steps of kneading the components indicated below and 25 parts of butyl acetate for 120 minutes using a kneader and dispersively mixing the resultant mixture with 225 parts of butyl acetate in a sand mill.

| | |
|---|---|
| Co-coated $\gamma$-Fe$_2$O$_3$ (Hc: 670 Oe, needle ratio: 10/1, average particle length: 0.3 μm, S-BET: 35 m$^2$/g) | 100 parts |
| Vinyl chloride/vinyl acetate/maleic acid anhydride copolymer (copolymerization ratio = 93:6:1) | 12 parts |
| Polyurethane resin (Tg: +4° C.) | 8 parts |
| Stearic acid | 2 parts |
| Butyl stearate | 2 parts |

The magnetic paint was coated on polyethylene terephthalate films prepared independently (thickness: 14 μm, dynamic modulus at 110° C.: values indicated in Table 3) using a reverse roll, in such a manner that the resultant layer after drying would have thickness of 5 μm. While the coated layer was wet, the layer was treated with an electromagnet of 1,000 gauss to impart a magnetic orientation. After the coated layer was dried, the layer was subjected to supercalendering, to form a magnetic recording layer having a smooth surface on the film.

The film having the magnetic recording layer was slit to give a video cassette tape having width of ½ inch.

COMPARISON EXAMPLE 3

The procedure of Example 4 was repeated except for using a polyethylene terephthalate film having dynamic modulus at 110° C. indicated in Table 3 to prepare a video cassette tape.

COMPARISON EXAMPLE 4

The procedure of Example 4 was repeated except that the vinyl chloride/vinyl acetate/maleic acid anhydride copolymer having copolymerization ratio of 93:6:1 and the polyurethane resin having Tg of +4° C. were replaced with a vinyl chloride/vinyl acetate/maleic acid anhydride copolymer having copolymerization ratio of 86:13:1 and a polyurethane resin having Tg of −32° C., respectively, to prepare a video cassette tape.

EVALUATION OF VIDEO CASSETTE TAPE

The video cassette tapes obtained in the above examples were measured on the dynamic modulus thereof at 110° C. Further, each tape was allowed to stand at 110° C. for 4 hours, and then the friction coefficient of the tape on the magnetic recording layer side against a stainless pole (diameter: 4 mm) was measured at an engagement angle of 180°.

Furthermore, after each tape was allowed to stand at 110° C. for 4 hours in such a condition that the tape was wound in a cassette, jitter and skew of the tape were measured using a VHS type video deck according to a conventional manner.

The results of the evaluations obtained above are set forth in Table 3 and 4.

TABLE 3

| | Dynamic modulus ($\times 10^{10}$ dyne/cm$^2$) | |
| --- | --- | --- |
| | Support (Db) | Tape (Dt) |
| Example 4 | 3.0 | 4.6 |
| Example 5 | 6.0 | 5.7 |
| Example 6 | 9.0 | 9.0 |
| Com. Example 3 | 2.0 | 3.8 |
| Com. Example 4 | 3.0 | 3.6 |

TABLE 4

| | After storage at 110° C. for 4 hours | | |
| --- | --- | --- | --- |
| | Friction coefficient | Jitter ($\mu s$) | Skew ($\mu s$) |
| Example 4 | 0.26 | 0.08 | 12 |
| Example 5 | 0.24 | 0.06 | 11 |
| Example 6 | 0.24 | 0.06 | 9 |
| Com. Example 3 | 0.32 | 0.22 | 28 |
| Com. Example 4 | 0.40 | 0.32 | 42 |

We claim:

1. A magnetic recording medium in the form of tape comprising a flexible support and a magnetic recording layer provided on said support, said magnetic recording layer comprising a ferromagnetic powder dispersed in a binder, which is characterized in that said magnetic recording medium has dynamic modulus of not lower than $4.5 \times 10^{10}$ dyne/cm$^2$ in the longitudinal direction at 110° C.

2. The magnetic recording medium as claimed in claim 1, wherein the dynamic modulus of said magnetic recording medium is not lower than $6.0 \times 10^{10}$ dyne/cm$^2$ in the longitudinal direction at 110° C.

3. The magnetic recording medium as claimed in claim 1, wherein the dynamic modulus of said magnetic recording medium is not lower than $8.0 \times 10^{10}$ dyne/cm$^2$ in the longitudinal direction at 110° C.

4. The magnetic recording medium as claimed in claim 1, wherein said flexible support has dynamic modulus of not lower than $2.5 \times 10^{10}$ dyne/cm$^2$ in the longitudinal direction at 110° C.

5. The magnetic recording medium as claimed in claim 1, wherein the dynamic modulus of said support is not lower than $5.5 \times 10^{10}$ dyne/cm$^2$ in the longitudinal direction at 110° C.

6. The magnetic recording medium as claimed in claim 1, wherein the dynamic modulus of said support is not lower than $8.5 \times 10^{10}$ dyne/cm$^2$ in the longitudinal direction at 110° C.

7. The magnetic recording medium as claimed in claim 1, wherein the dynamic modulus of said flexible support in the longitudinal direction at 110° C. is not less than 80% and not more than 130% of the dynamic modulus of said magnetic recording medium in the longitudinal direction at 110° C.

8. The magnetic recording medium as claimed in claim 1, wherein the dynamic modulus of said flexible support in the longitudinal direction at 110° C. is higher than the dynamic modulus of said magnetic recording medium in the longitudinal direction at 110° C.

* * * * *